US008289612B2

(12) United States Patent
Yoon et al.

(10) Patent No.: US 8,289,612 B2
(45) Date of Patent: Oct. 16, 2012

(54) MICRO-MIRROR AND MICRO-MIRROR ARRAY USING THE SAME

(75) Inventors: Jun-Bo Yoon, Daejeon (KR); Dae-Hyun Kim, Daejeon (KR); Min-Woo Kim, Daejeon (KR); Jin-Wan Jeon, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 1026 days.

(21) Appl. No.: 12/251,912

(22) Filed: Oct. 15, 2008

(65) Prior Publication Data

US 2009/0097099 A1     Apr. 16, 2009

(30) Foreign Application Priority Data

Oct. 15, 2007   (KR) .................. 10-2007-0103410

(51) Int. Cl.
  *G02B 26/00*   (2006.01)

(52) U.S. Cl. ...................................................... 359/290
(58) Field of Classification Search .......... 359/290–292, 359/295, 298, 220, 223, 224, 320, 556, 572
  See application file for complete search history.

(56) References Cited

U.S. PATENT DOCUMENTS

| 7,085,028 B2 * | 8/2006 | Tanaka et al. ............... 359/35 |
| 7,099,066 B2 * | 8/2006 | Tsuboi et al. ............... 359/291 |
| 7,274,347 B2 * | 9/2007 | Richards ..................... 345/84 |
| 7,880,952 B2 * | 2/2011 | Maeda et al. ............... 359/290 |

* cited by examiner

*Primary Examiner* — Ricky Mack
*Assistant Examiner* — Tuyen Tra
(74) *Attorney, Agent, or Firm* — The Belles Group, P.C.

(57) ABSTRACT

Disclosed are a micro mirror and a micro mirror array using the same. The micro mirror includes: an insulation substrate; an address electrode formed on the insulation substrate; a charging unit electrically insulated from the address electrode; and a reflecting body rotatably provided on the insulation to reflect incident light and spaced apart from the address electrode and the charging unit.

26 Claims, 16 Drawing Sheets

MICRO-MIRROR AND MICRO-MIRROR ARRAY USING THE SAME

CROSS-REFERENCE TO RELATED APPLICATION

This non-provisional application claims priority under 35 U.S.C. §119(a) to Korean Patent Application No. 10-2007-0103410, filed Oct. 15, 2007, the entire contents of which are hereby incorporated by reference.

FIELD OF THE INVENTION

The present invention relates to a micro mirror and a micro mirror array using the same, and more particularly to an electro-statically driven micro mirror and a micro mirror array using the same.

DESCRIPTION OF THE RELATED ART

In recent years, micro mirrors have become widely used in optical scanning devices such as an image display device, an optical switch, an exposure device without a mask, a bio sensor, a scanner, a copy machine, or a facsimile.

Among them, an electro-statically driven micro mirror changes the reflection path of incident light by an electrostatic attraction, and this has become widely used for an optical scanning device. In the electro-statically driven micro mirror, the larger the tilting angle of a reflecting body (mirror) reflecting incident light is, the larger a change in width of reflecting light may be increased. For example, the larger the tilting angle of a reflecting body (mirror) used in a projection display, the greater the contrast that is able to be obtained. This enables a better image to be obtained.

FIGS. 1 to 3 are views illustrating a conventional electro-statically driven micro mirror 100. FIG. 1 is a perspective view of the conventional electro-statically driven micro mirror 100. FIG. 2 is a cross-sectional view of the conventional electro-statically driven micro mirror 100 taken along line A-A' of FIG. 1. FIG. 3 is a cross-sectional view illustrating a drive of the conventional electro-statically driven micro mirror 100.

As shown in FIGS. 1 to 3, the conventional electro-statically driven micro mirror 100 includes an insulation substrate 110, an address electrode 120, a reflecting body 150, hinges 160a and 160b, support units 170a and 170b, and a stop electrode 180a. When a predetermined voltage is applied between the address electrode 120 and the reflecting body 150, the reflecting body 150 rotates based on the hinges 160a and 160b by an electrostatic force generated between the address electrode 120 and the reflecting body 150. A driving voltage and a tilting angle of the conventional micro mirror 100 are determined by areas, the sizes, and a spacing of the address electrode 120 and the reflecting body 150, and restoring force of the hinges 160a and 160b. For example, conventionally, to drive the conventional micro mirror 100 with a low voltage, areas of the address electrode 120 and the reflecting body 150 are designed to be large and the spacing between the address electrode 120 and the reflecting body 150 is designed to be short. Otherwise, restoring forces of the hinges 160a and 160b tend to be weak. When areas of the address electrode 120 and the reflecting body 150 are designed to be large, there is a problem that the tilting angle becomes small Further, when the restoring forces of the hinges 160a and 160b are designed to be weak, the weak restoring forces lower an operation speed of the micro mirror 100. Moreover, the durability against external noise becomes weak so as not to secure a reliably continuous operation. In addition, so as to increase the tilting angle of the reflecting body 150 in the micro mirror 100, the size of the reflecting body 150 is designed to be small and the spacing between the address electrode 120 and the reflecting body 150 is designed to be long. Accordingly, a driving voltage of the micro mirror 100 is set to be great.

SUMMARY OF THE INVENTION

The present invention has been made in view of the above problems, and it is an object of the present invention to provide a micro mirror that may reduce a driving voltage and increase the tilting angle, and a micro mirror array using the same.

In accordance with an exemplary embodiment of the present invention, there is provided a micro mirror, comprising: an insulation substrate; an address electrode formed on the insulation substrate; a charging unit electrically insulated from the address electrode; and
a reflecting body rotatably provided on the insulation substrate to reflect incident light and spaced apart from the address electrode and the charging unit.

The micro mirror further comprises an insulation layer formed between the address electrode and the charging unit. The charging unit is spaced apart from the address electrode on the insulation substrate. The micro mirror further comprises: a transfer electrode connected to a opposite surface of a reflecting surface in the reflecting body reflecting the incident light; a hinge connected to a rotational shaft of the transfer electrode; and a support unit supporting the transfer electrode from the insulation substrate. The hinge is made with an elastic material. The micro mirror reflecting body is formed on the hinge and the support unit not to expose the hinge and the support unit to the incident light.

The micro mirror further comprises: a transfer electrode formed on the same plane as that of the reflecting body and connected to the reflecting body; a hinge connected to a rotational shaft of the transfer electrode; and a support unit supporting the transfer electrode from the insulation substrate. The transfer electrode has a comb pattern. The hinge is made with an elastic material. The micro mirror further comprises a support unit supporting the reflecting body from the insulation substrate, wherein the reflecting body is made with an elastic material. The charging unit is previously charged with a charge. The micro mirror further comprises a discharge prevention layer formed on a surface of the charging unit.

In accordance with another aspect of the present invention, there is provided a method for driving a micro mirror including an insulation substrate, an address electrode formed on the insulation substrate, a charging unit electrically insulated from the address electrode, and a reflecting body rotatably provided on the insulation substrate to reflect incident light and spaced apart from the address electrode and the charging unit, comprising the steps of: charging the charging unit with a charge; and applying a driving voltage between the address electrode and the reflecting body.

Charging the charging unit includes: applying a voltage to the charging unit; and electrically floating the charging unit charged with the charge.

In accordance with a further aspect of the present invention, there is provided a micro mirror array including a plurality of micro mirrors arranged in a row or column direction, each of the micro mirror comprising: an insulation substrate; an address electrode formed on the insulation substrate; a charging unit electrically insulated from the address electrode; and a reflecting body rotatably provided on the insulation substrate to reflect incident light and spaced apart from the address electrode and the charging unit.

According to the present invention, a driving voltage of the micro mirror may be reduced, and a tilting angle thereof may be increased.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Figure 1:
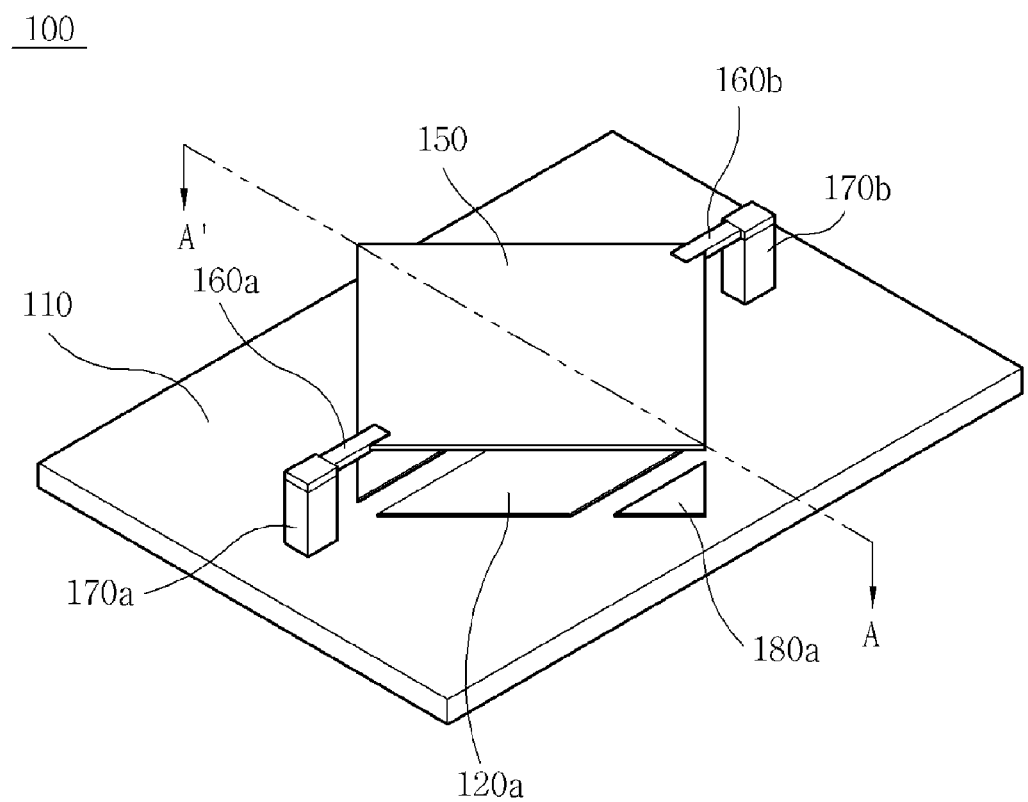
FIGS. 1 to 3 are views illustrating a conventional electrostatically driven micro mirror.

Hereinafter, exemplary embodiments of the present invention are described in detail with reference to the accompanying drawings. The same reference numerals are used throughout the drawings to refer to the same or like parts. Detailed descriptions of well-known functions and structures incorporated herein may be omitted to avoid obscuring the subject matter of the present invention.

Figure 4:
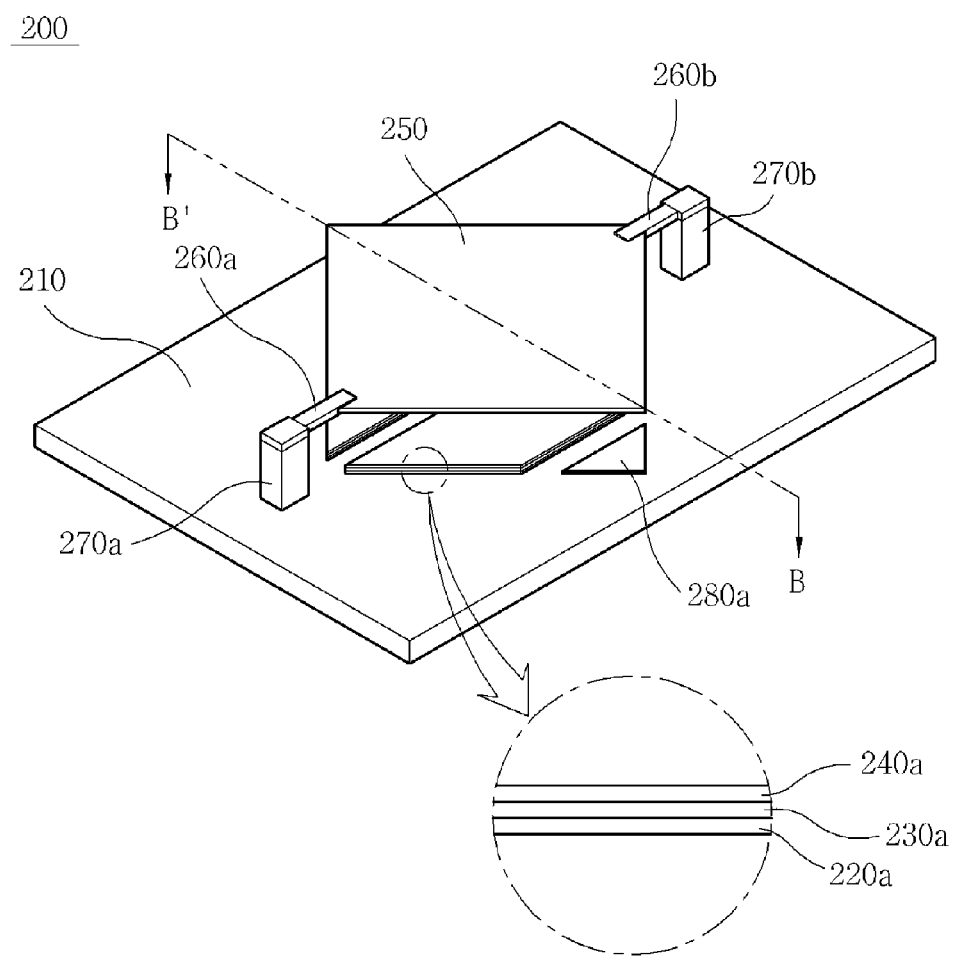
FIGS. 4 to 7 are views illustrating a micro mirror in accordance with a first embodiment of the present invention.
Figure 5:
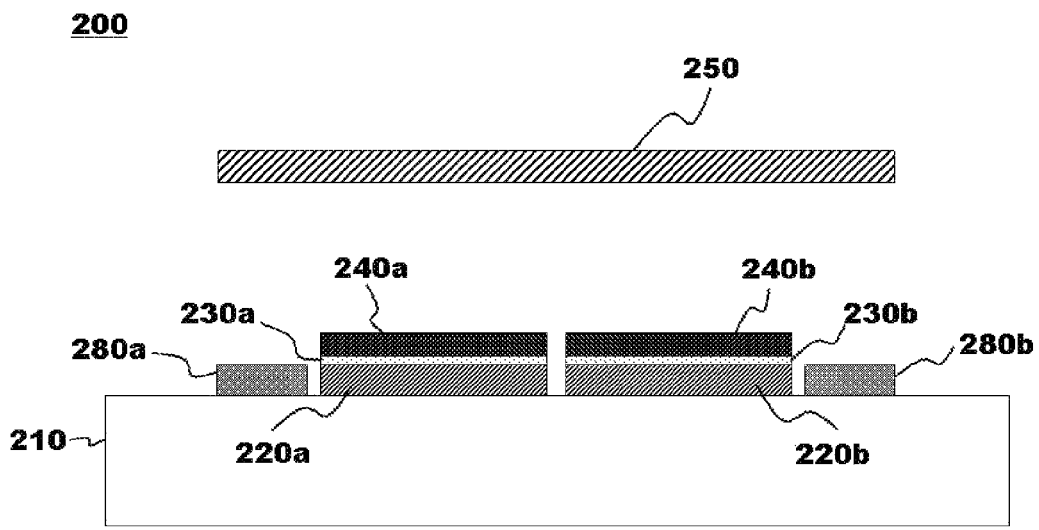
Figure 6:
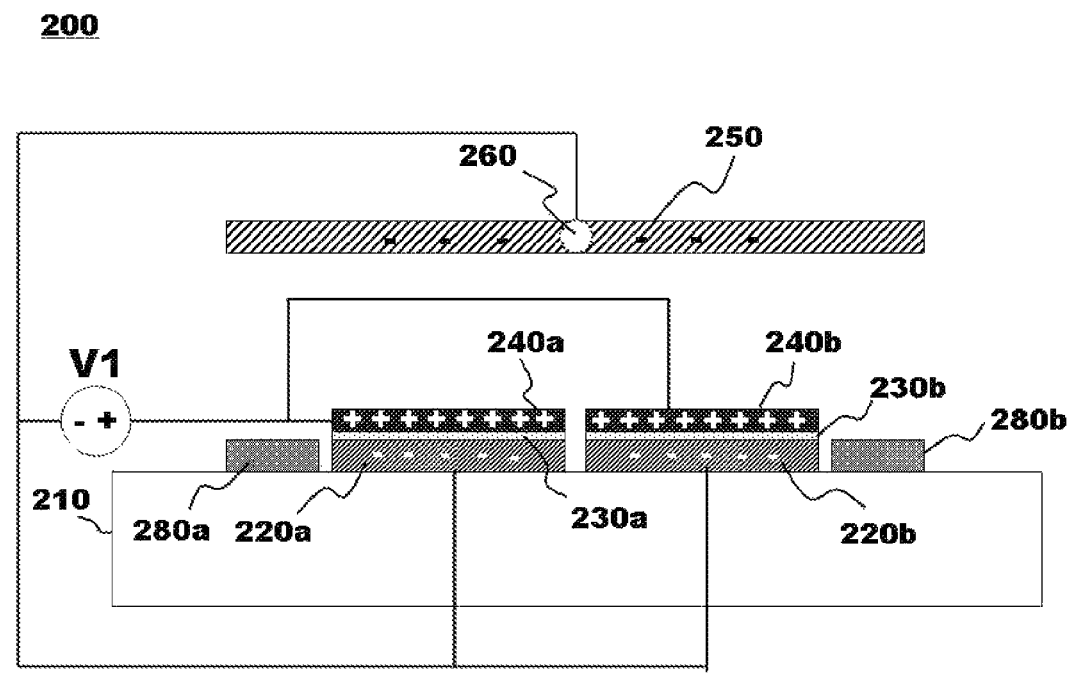
Figure 7:
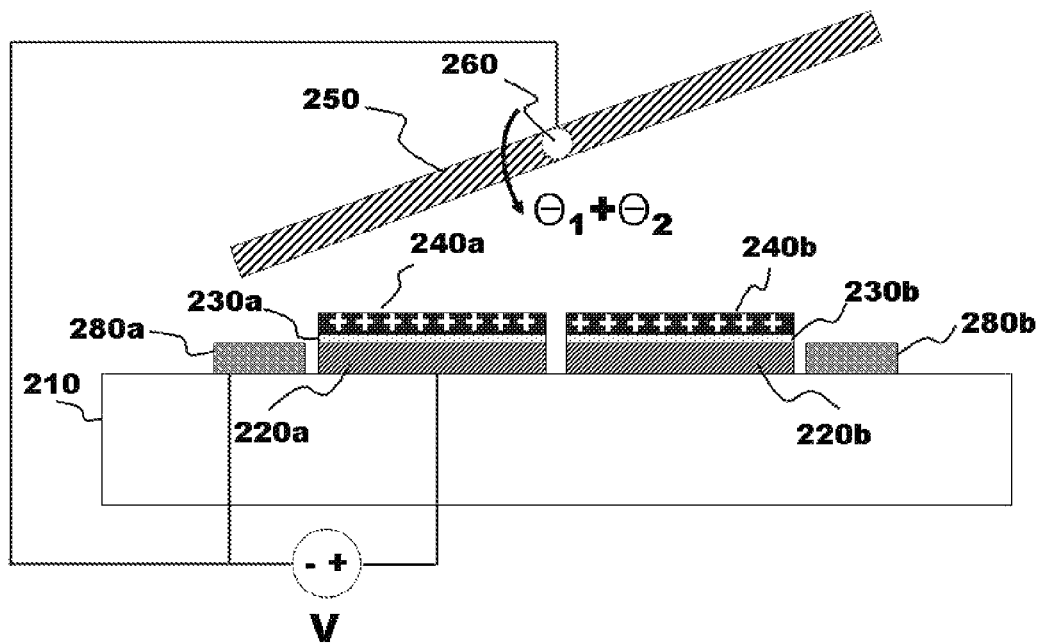

FIGS. 4 to 7 are views illustrating a micro mirror 200 in accordance with a first embodiment of the present invention. FIG. 4 is a perspective view of the micro mirror 200. FIG. 5 is a cross-sectional view of the micro mirror 200 taken along line A-A' of FIG. 5. FIGS. 6 and 7 are cross-sectional views illustrating a driving method of the micro mirror 200 in accordance with a first embodiment of the present invention.

As shown in FIGS. 4 and 5, the micro mirror 200 in accordance with a first embodiment of the present invention includes an insulation substrate 210, first and second address electrodes 220a and 220b, first and second charging units 240a and 240b, and a reflecting body 250.

The insulation substrate 210 means a substrate made from an insulation material. The first and second address electrodes 220a and 220b, a stop electrode 280a, and first and second support units 270a and 270b are formed on the insulation substrate 210. Further, the insulation substrate 210 supports the reflecting body 250 so that the reflecting body 250 is spaced apart from the first and second addresses 220a and 220b, and the first and second charging units 240a and 240b.

The first and second address electrodes 220a and 220b are formed on the insulation substrate 210, which are made from an electrically conductive material. The first and second address electrodes 220a and 220b may be formed of a semiconductor or a conductor such as a dopant-doped polycrystalline silicon or metal.

The first and second charging units 240a and 240b are electrically insulated from the first and second address electrodes 220a and 220b by first and second insulation layers 230a and 230b. In this case, a discharge prevention layer is formed on surfaces of the first and second charging units 240a and 240b to prevent a charge charged in the first and second charging units 240a and 240b from being discharged.

Figure 10:
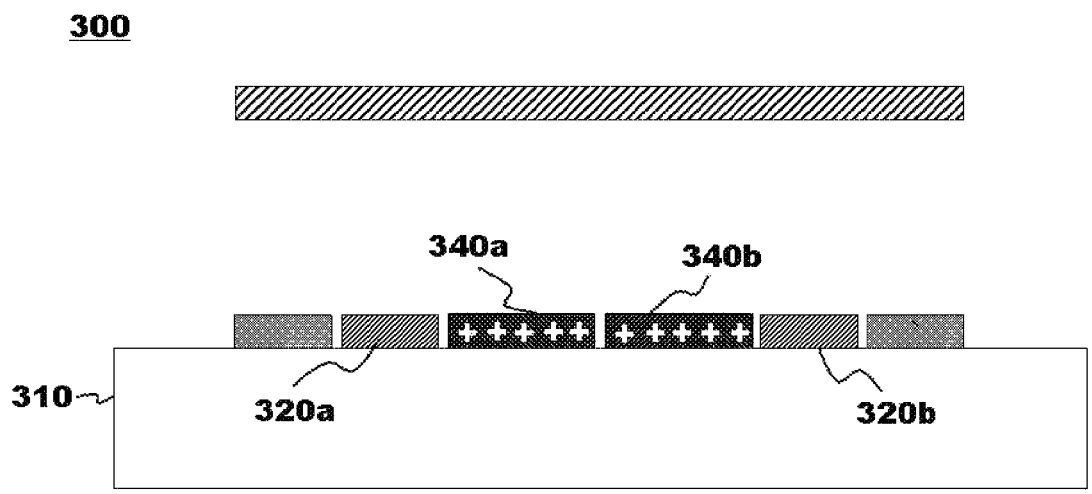
FIG. 10 is a cross-sectional view illustrating a micro mirror in accordance with a second embodiment of the present invention.

Meanwhile, the first embodiment of the present invention has been described such that the first and second insulation layers 230a and 230b are formed on the first and second address electrodes 220a and 220b, and the first and second charging units 240a and 240b are formed on the first and second insulation layers 230a and 230b. However, the present invention is not limited thereto. FIG. 10 is a cross-sectional view illustrating a micro mirror 300 in accordance with a second embodiment of the present invention. As shown in FIG. 10, in the micro mirror 300 in accordance with a second embodiment of the present invention, first and second charging units 340a and 340b, and first and second address electrodes 320a and 320b are spaced apart from each other to be electrically insulated from each other. In this case, a position of the first address electrode 320a and a position of the first charging unit 340a may be changed with each other. Further, a position of the second address electrode 320b and a position of the second charging unit 340b may be changed with each other.

The reflecting body 250 reflects light incident to the micro mirror 200 in accordance with the first embodiment of the present invention at a predetermined angle. In order to reflect the incident light at the predetermined angle, a rotational shaft of the reflecting body 250 is made with an elastic material such as a spring. First and second hinges 260a and 260b are connected with the rotational shaft of the reflecting body 250 that enable the reflecting body 250 to return back to its original position. In this case, the first and second hinges 260a and 260b are made with an electrically conductive material, and are electrically connected to the reflecting body 250. The first and second hinges 260a and 260b are connected to one end of the first support unit 270a and one end of the second support unit 270b, respectively. The other ends of the first and second support units 270a and 270b are attached to the insulation substrate 210. Accordingly, the reflecting body 250 is disposed in upper portions of the first and second address electrodes 220a and 220b, and in upper portions of the first and second charging units 240a and 240b by the first and second support units 270a and 207b. The reflecting body 250 is electrically insulated from the first and second address electrodes 220a and 220b by the insulation substrate 210. The reflecting body 250 may be made with an electrically conductive material to be driven by an electrostatic attraction generated between the first and second address electrodes 220a and 220b. The reflecting body 250 may be formed of a semiconductor or a conductor such as a dopant-doped polycrystalline silicon or metal.

First and second stop electrodes 280a and 280b are spaced apart from the first and second address electrodes 220a and 220b on the insulation substrate 210. The first and second stop electrodes 280a and 280b are preferably disposed on the insulation substrate 210 so that the reflecting body 250 does not contact with the first and second address electrode 220a and 220b or the first and second charging units 240a and 240b. A maximum tilting angle of the reflecting body 250 is determined according to positions of the first and second stop electrodes 280a and 280b.

Meanwhile, as shown in FIGS. 4 and 5, a micro mirror array can be constructed by arranging a plurality of micro mirrors 200 in accordance with a first embodiment of the present invention in row and column directions.

FIGS. 6 and 7 (cross-sectional views taken along line B-B' of FIG. 4.) are views illustrating a driving method of the micro mirror 200 in accordance with a first embodiment of the present invention. As shown in FIGS. 6 and 7, the driving method of the micro mirror 200 in accordance with a first embodiment of the present invention comprises the steps of: charging the first and second charging units 240a and 240b with a charge; and applying a driving voltage V1 between the first and second address electrodes 220a and 220b and the reflecting body 250.

FIG. 6 illustrates a step of charging the first and second charging units 240a and 240b with a charge. As shown in FIG. 6, the first and second charging units 240a and 240b are charged with a charge (positive or negative charge). So as to charge the charge, a voltage V1 is applied between the first and second charging units 240a and 240b and the reflecting body 250, or between the first and second charging units 240a and 240b and the first and second address electrodes 220a and 220b.

Accordingly, the charge (positive or negative charge) is induced in the first and second charging units 240a and 240b. In this case, when the first and second hinges 260a and 260b are electrically connected to the reflecting body 260, a voltage V1 may be applied to the first and second hinges 260a and 260b. Next, by making the first and second charging units 240a and 240b in an electrically floating state, the charge induced in the first and second charging units 240a and 240b is maintained without variation. In order to make the first and second charging units 240a and 240b in an electrically floating state, the first and second charging units 240a and 240b may be shorted by a mechanical switch or can be physically shorted by applying a voltage V1 by using probe.

FIG. 7 illustrates a step of applying a driving voltage V1 between the first address electrode 220a and the reflecting body 250. As shown in FIG. 7, a driving voltage V is applied between the first address electrode 220a and the reflecting body 250. Accordingly, different polar charges are induced in the first address electrode 220a and the reflecting body 250. In this case, the driving voltage V is applied so that a charge having the same polarity as that of the charge induced in the first charging unit 240a is induced in the first address electrode 220a. As a result, a first electrostatic attraction is generated between the reflecting body 250 and the first charging unit 240a and a second electrostatic attraction is generated between the reflecting body 250 and the first address electrode 220a. If a sum of the first and second electrostatic attractions is equal to or greater than a threshold value, the reflecting body 250 rotates in a direction of the first address electrode 220a based on the hinge 160 being a rotational shaft. The reflecting body 250 rotates at a predetermined angle ($\theta1+\theta2$) such that the sum of the first and second electrostatic attractions and the restoring force of the hinge 260 such as a spring are balanced with each other.

Figure 2:
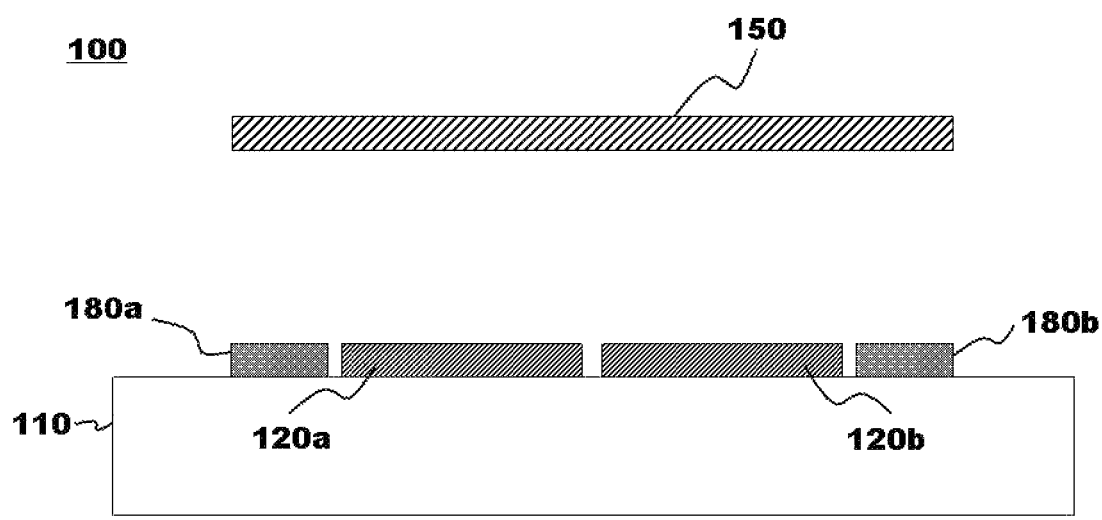
Figure 3:
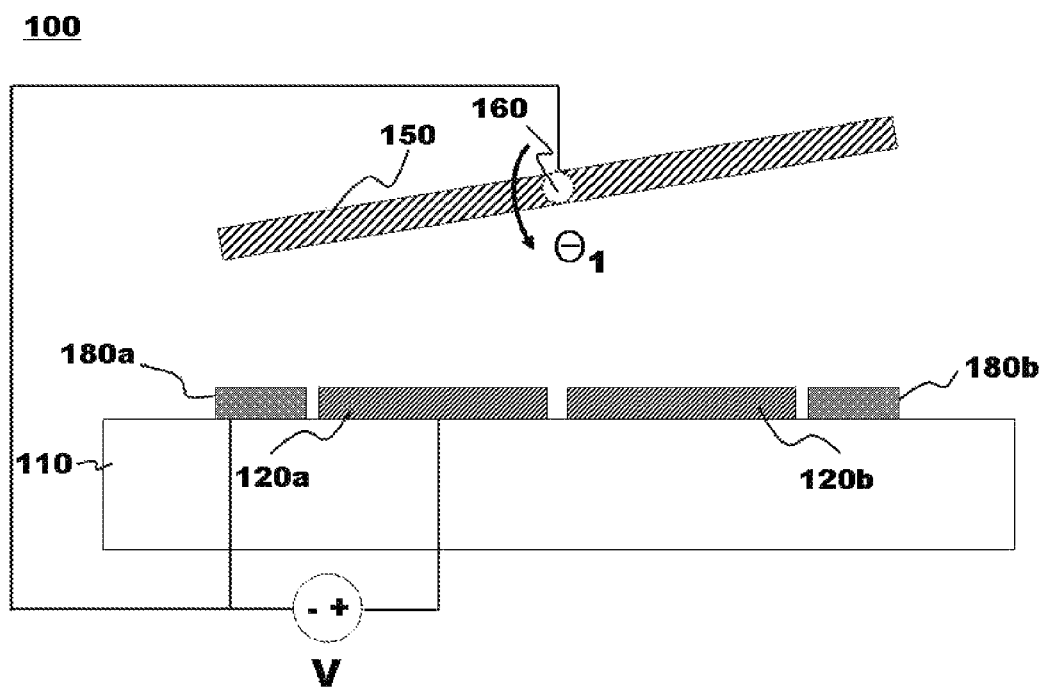

As described above, the micro mirror 200 in accordance with a first embodiment of the present invention shown in FIGS. 4 to 7 has been now explained in comparison with the conventional micro mirror 100 shown in FIGS. 1 to 3. In the conventional micro mirror 100, when a driving voltage V is applied between a first address electrode 120a and a reflecting body 150, the reflecting body 150 rotates at an angle of $\theta1$ based on a hinge 160 being a rotational shaft. On the other hand, in the micro mirror 200 in accordance with a first embodiment of the present invention, because the first charging unit 240 is previously charged with a charge, when the same driving voltage V as the driving voltage V in the conventional micro mirror 100 is applied between the first address electrode 220a and the reflecting body 250, the reflecting body 250 rotates by an angle of $\theta1+\theta2$ by a sum of first and second electrostatic attractions. The angle $\theta2$ is determined by the charge previously charged in the first charging unit 240a. As the charged charge is increased larger, the angle $\theta2$ may be increased greater.

In summary, when the driving voltage V for the conventional micro mirror 100 is applied to the micro mirror 200 in accordance with the first embodiment of the present invention, the micro mirror 200 may obtain a greater tilting angle than that of the conventional micro mirror 100 by $\theta2$. From a different point of view, the micro mirror 200 in accordance with the first embodiment of the present invention may obtain the same tilting angle $\theta1$ obtained by the conventional micro mirror 100 with a driving voltage V' less than the driving voltage V in the conventional micro mirror 100.

Hereinafter, the conventional micro mirror 100 and the micro mirror 200 in accordance with the first embodiment of the present invention are compared with each other with reference to FIGS. 8 and 9.

Figure 8:
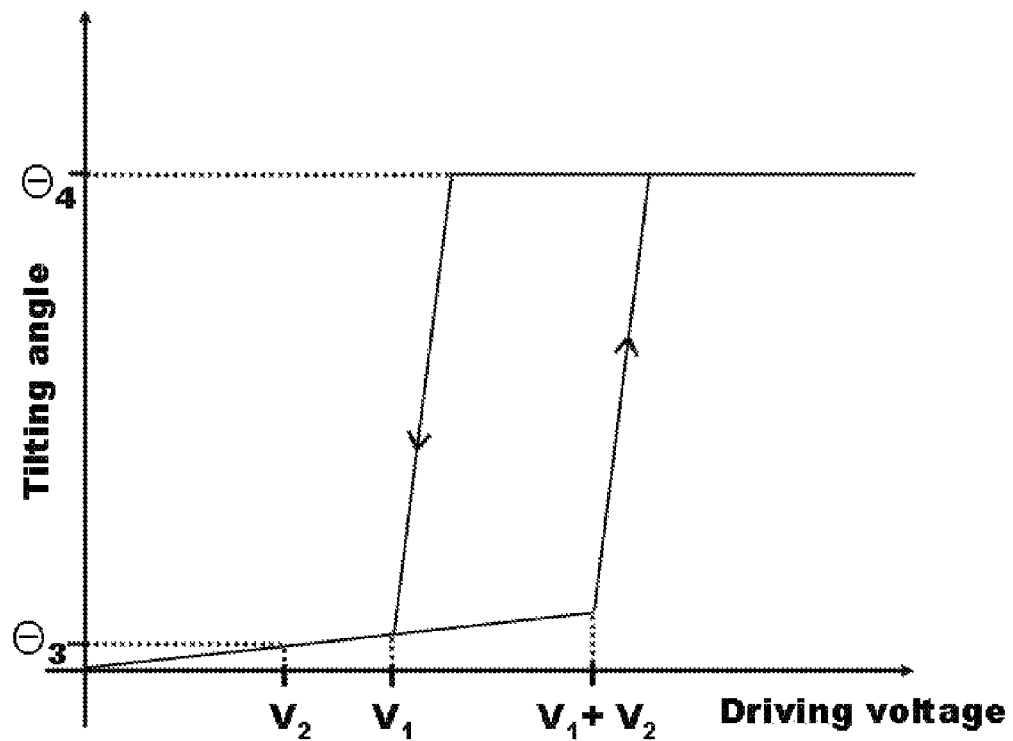
FIG. 8 is a graph illustrating hysteresis of the conventional electro-statically driven micro mirror shown in FIGS. 1 to 3.

FIG. 8 is a graph illustrating hysteresis of the conventional electro-statically driven micro mirror shown in FIGS. 1 to 3. As shown in FIG. 8, when a driving voltage applied between the first address electrode 120a and the reflecting body 150 in the conventional micro mirror 100 may be increased, the reflecting body 150 rotates at a tilting angle determined by the applied driving voltage and a restoring force of the hinge 160. When the driving voltage applied between the first address electrode 120a and the reflecting body 150 becomes V1+V2, the reflecting body 150 collides with the stop electrode 180a and obtains a maximum tilting angle $\theta4$ determined by a construction of the conventional micro mirror 100. Such as, although the applied driving voltage is increased beyond V1+V2, the tilting angle is no longer increased due to the stop electrode 180a. In this case, the driving voltage V1+V2 is referred to as 'pull-in voltage'.

Upon reduction of the driving voltage applied between the first address electrode 120a and the reflecting body 150, when the driving voltage becomes V1, the reflecting body 150 maintaining a maximum tilting angle $\theta4$ is apart from the stop electrode 180, with the result that the tilting angle is rapidly reduced. The driving voltage V of this case is referred to as 'pull-out voltage'. When the driving voltage is reduced to V2 less than V1, the conventional micro mirror 100 maintains a tilting angle $\theta3$ determined by the driving voltage V2 applied between the first address electrode 120a and the reflecting body 150, and a restoring force of the hinge 160. The conventional micro mirror 100 performs digital driving using two voltages of OV of a hysteresis graph and V1+V2 or analog driving using a voltage between OV and V1+V2 as the driving voltage.

Figure 9:
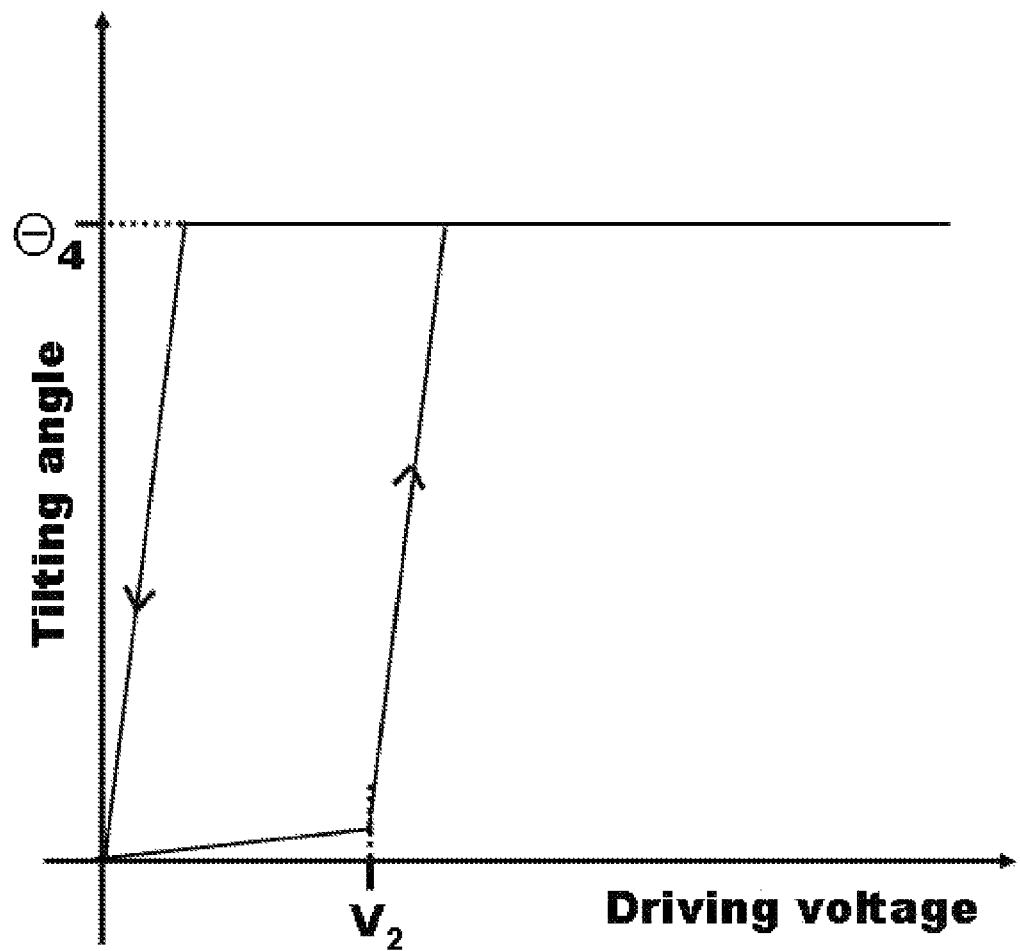
FIG. 9 is a graph illustrating hysteresis of the micro mirror in accordance with a first embodiment of the present invention.

FIG. 9 is a graph illustrating hysteresis of the micro mirror 200 in accordance with a first embodiment of the present invention. The first charging unit 240a of the micro mirror 200 is charged with a predetermined charge in advance. Upon increase of a driving voltage applied between the first address electrode 220a and the reflecting body 250, the reflecting body 250 rotates at a tilting angle determined by the driving voltage and a restoring force of the hinge 260. When the applied driving voltage becomes V2, the reflecting body 250 collides with the stop electrode 280a and the micro mirror 200 obtains a maximum tilting angle θ4. That is, in the micro mirror 200 in accordance with the first embodiment of the present invention, although a voltage of V2 (V2<V1) is applied between the first address electrode 220*a* and the reflecting body 250, it may obtain the same maximum tilting angle θ4 obtained by the conventional micro mirror 100.

As described above, the micro mirror 200 in accordance with a first embodiment of the present invention may obtain the maximum tilting angle θ4 with the driving voltage V2 less than the driving voltage V1+V2 applied in the conventional micro mirror 100 to obtain the same maximum tilting angle θ4.

Further, when applying the same driving voltage to the conventional micro mirror 100 and the micro mirror 200 in accordance with a first embodiment of the present invention, the micro mirror 200 may obtain a greater tilting angle than that obtained in the conventional micro mirror 100. According to charge quantity charged in the first charging unit 240*a*, although less driving voltage is applied, the micro mirror 200 may obtain a greater tilting angle. According to charge quantity charged in the first charging unit 240*a*, the micro mirror 200 may rotate the reflecting body 250 connected to a hinge 260 having a large restoring force with the same driving voltage or a lower driving voltage. Accordingly, a driving speed of the micro mirror 200 is higher than that of the conventional micro mirror 100. The micro mirror 200 has the more excellent durability against external noise than that of the conventional micro mirror 100. The micro mirror 200 may perform a reliably continuous operation. Namely, the micro mirror 200 in accordance with a first embodiment of the present invention may obtain a great tilting angle, have a higher driving speed, and perform reliably continuous operation with a lower driving voltage according to charge quantity charged in a charging unit.

FIG. 10 is a cross-sectional view illustrating a micro mirror in accordance with a second embodiment of the present invention. Unlike a construction of the a micro mirror 200 in accordance with a first embodiment of the present invention, as shown in FIG. 10, first and second charging units 340*a* and 340*b* of a micro mirror 300 in accordance with a second embodiment of the present invention are spaced apart from first and second address electrodes 320*a* and 320*b* on an insulation substrate 310 in order to be electrically insulated from the first and second address electrodes 320*a* and 320*b*.

In FIG. 10, a position of the first address electrode 320*a* and a position of the first charging unit 340*a* may be changed with each other. Further, a position of the second address electrode 320*b* and a position of the second charging unit 340*b* may be changed with each other.

Remaining structural elements and a driving method thereof have substantially the same functions as those of the micro mirror 200 in accordance with the first embodiment of the present invention and the description thereof is omitted.

Meanwhile, in the first embodiment and the second embodiment, a reflecting body 250 of the micro mirrors 200 and 300 functions as an electrode generating an electrostatic force between the reflecting body 250, and address electrodes 220 and 320, and between the reflecting body 250 and the charging units 240 and 340, and reflects incident light at a predetermined angle. However, in the first embodiment and the second embodiment, since first and second hinges 260*a* and 260*b* and support units 270*a* and 270*b* for rotating and supporting the reflecting body 250 are exposed to the incident light, loss of the incident light per unit area occurs. Such loss of the incident light is a severe problem when a micro mirror implements images in a form of an array in an application field of an image display device. In order to solve the problem, there is provided a micro mirror 400 in accordance with a third embodiment of the present invention. The following is a description of the micro mirror 400 in accordance with a third embodiment of the present invention referring to FIG. 11.

Figure 11:
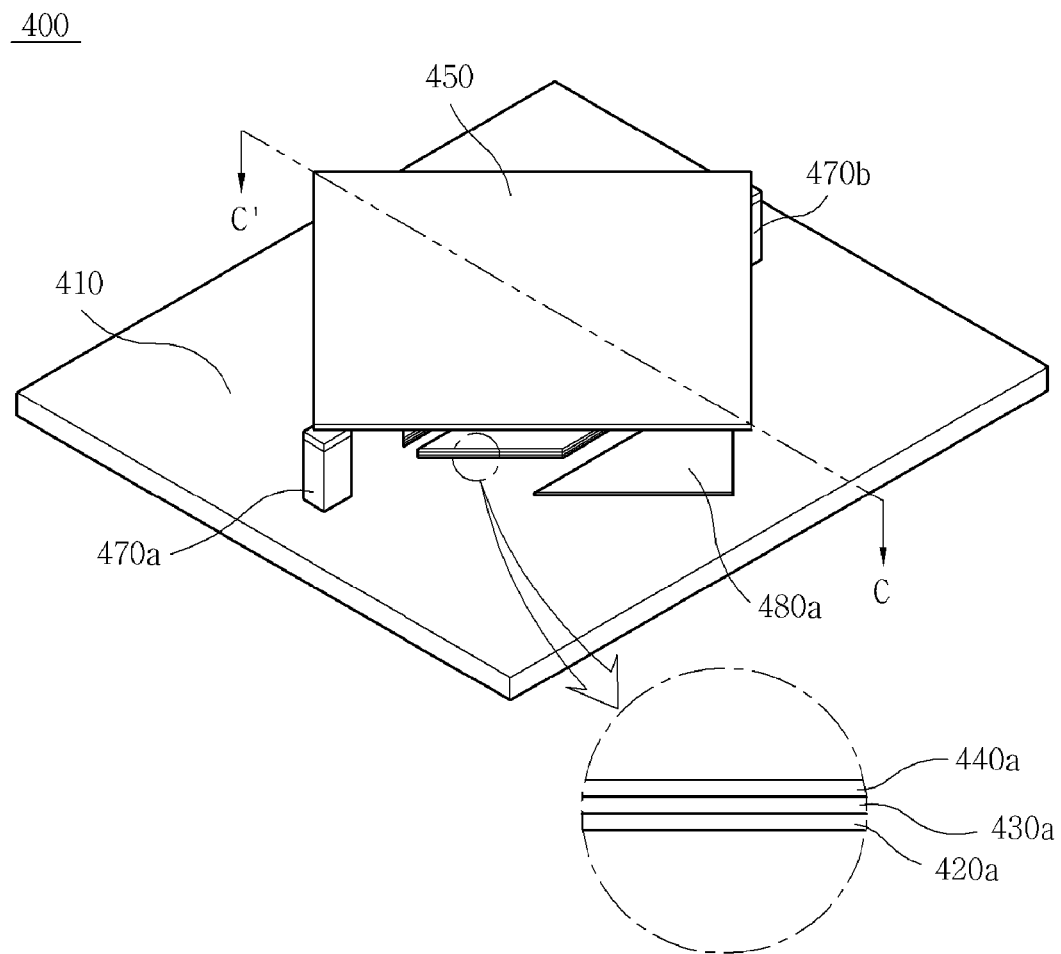
FIGS. 11 and 12 are views illustrating a micro mirror in accordance with a third embodiment of the present invention.
Figure 12:
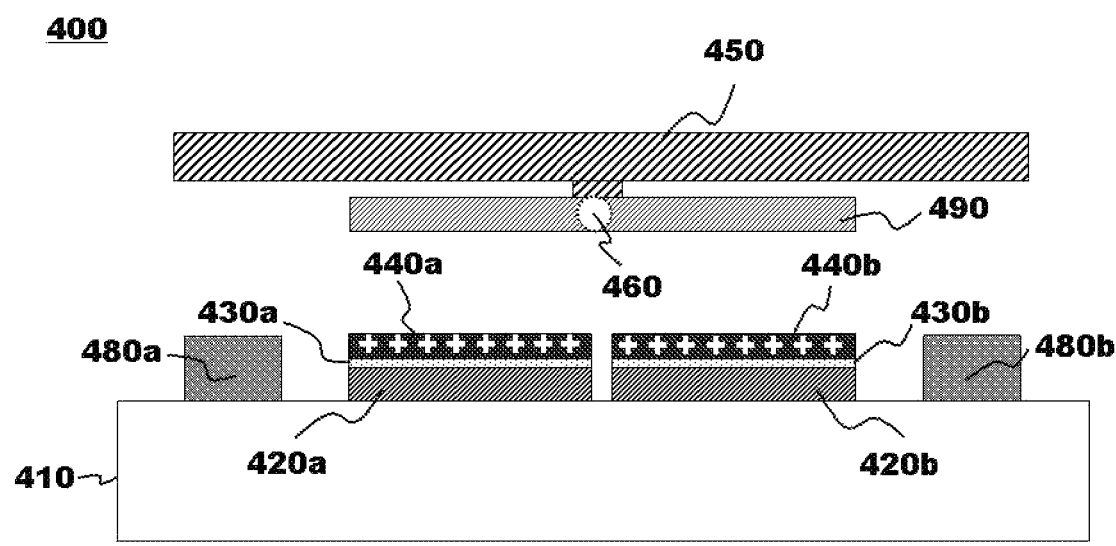

FIGS. 11 and 12 are views illustrating a micro mirror 400 in accordance with a third embodiment of the present invention FIG. 11 is a perspective view of the micro mirror 400. FIG. 12 is a cross-sectional view of the micro mirror 400 taken along line C-C' of FIG. 11. As shown in FIGS. 11 and 12, the micro mirror 400 in accordance with a third embodiment of the present invention includes an insulation substrate 410, first and second address electrodes 420*a* and 420*b*, first and second charging units 440*a* and 440*b*, a reflecting body 450, first and second hinges 460*a* and 460*b*, first and second support units 470*a* and 470*b*, and a transfer electrode 490.

Because the insulation substrate 410, the first and second address electrodes 420*a* and 420*b*, and the first and second charging units 440*a* and 440*b* have substantially the same functions as those of the micro mirror of the first or second embodiment, a description thereof is omitted.

The reflecting body 450 is spaced apart from the first and second address electrodes 420*s* and 420*b*, and the first and second charging units 440*a* and 440*b*. The reflecting body 450 may be formed of a semiconductor or a conductor such as a dopant-doped polycrystalline silicon or metal. The transfer electrode 490 is connected to the reflecting body 450. Accordingly, the reflecting body 450 reflects incident light at a predetermined angle by a motion of the transfer electrode 490. In this case, when the transfer electrode 490 is electrically connected to the reflecting body 450 and is made with an electrically conductive material, the transfer electrode 490 has the same electric potential as that of the reflecting body 450. Since the reflecting body 450 is formed to upper portions of the first and second hinges 460*a* and 460*b*, and the first and second support units 470*a* and 470*b*, loss of incident light in the first and second hinges 460*a* and 460*b*, and the first and second support units 470*a* and 470*b* may be reduced.

The first and second hinges 460*a* and 460*b* are connected with a rotational shaft of the transfer electrode 490, and are made with an elastic material. The first and second hinges 460*a* and 460*b* enable the transfer electrode 490 to rotate according to a voltage applied to the transfer electrode 490, and first and second address electrodes 420*a* and 420*b*.

The transfer electrode 490 is connected to a opposite surface of a reflecting surface reflecting the incident light in the reflecting body 450. The transfer electrode 490 is made with an electrically conductive material. For example, the transfer electrode 490 may be formed of a semiconductor or a conductor such as a dopant-doped polycrystalline silicon or metal Because the first and second hinges 460*a* and 460*b* are connected and attached to a rotational shaft of the transfer electrode 490, the transfer electrode 490 may rotate based on the rotational shaft thereof.

Meanwhile, in FIGS. 11 and 12, first and second insulation layers 430*a* and 430*b* are formed between the first and second address electrodes 420*a* and 420*b* and the first and second charging units 440*a* and 440*b* so that the first and second charging units 440*a* and 440*b* are electrically insulated from the first and second address electrodes 420*a* and 420*b*. However, the present invention is not limited thereto. That is, as the micro mirror 300 in accordance with the second embodiment of the present invention, the first and second address electrodes 420*a* and 420*b*, and the first and second charging units 440*a* and 440*b* are spaced apart from each other on the insulation substrate 410.

In the driving method of the micro mirror 400 in accordance with the third embodiment of the present invention, shown in FIGS. 11 and 12, the first and second charging units 440a and 440b are charged with a charge (positive or negative charge). So as to charge the charge, a voltage V1 is applied between the first and second charging units 440a and 440b and the transfer electrode 490, or between the first and second charging units 440a and 440b and the first and second address electrodes 420a and 420b. Accordingly, the charge (positive or negative charge) is induced in the first and second charging units 440a and 440b. In this case, a voltage V1 may be applied to the transfer electrode 490 or the hinge 460 electrically connected to the transfer electrode 490. Next, by making the first and second charging units 440a and 440b in an electrically floating state, the charge induced in the first and second charging units 440a and 440b is maintained without variation. In order to make the first and second charging units 440a and 440b in an electrically floating state, the first and second charging units 440a and 440b may be shorted by a mechanical switch or can be physically shorted by applying a voltage V1 by using probe.

Next, a driving voltage V is applied between the first address electrode 420a and the transfer electrode 490. Accordingly, different polar charges are induced in the first address electrode 420a and the transfer electrode 490. In this case, the driving voltage V is applied so that a charge having the same polarity as that of the charge induced in the first charging unit 440a is induced in the first address electrode 420a. As a result, a first electrostatic attraction is generated between the transfer electrode 490 and the first charging unit 440a, and a second electrostatic attraction is generated between the transfer electrode 490 and the first address electrode 420a. If a sum of the first and second electrostatic attractions is equal to or greater than a threshold value, the transfer electrode 490 rotates in a direction of the first address electrode 420a based on the hinge 460 functioning as a rotational shaft. The transfer electrode 490 rotates at a predetermined angle such that the sum of the first and second electrostatic attractions and the restoring force of the hinge 460 such as a spring are balanced with each other. The reflecting body 450 electrically connected to the transfer electrode 490 rotates according to a rotation of the transfer electrode 490. Accordingly, the reflecting body 450 may reflect incident light at a predetermined angle.

Figure 13:
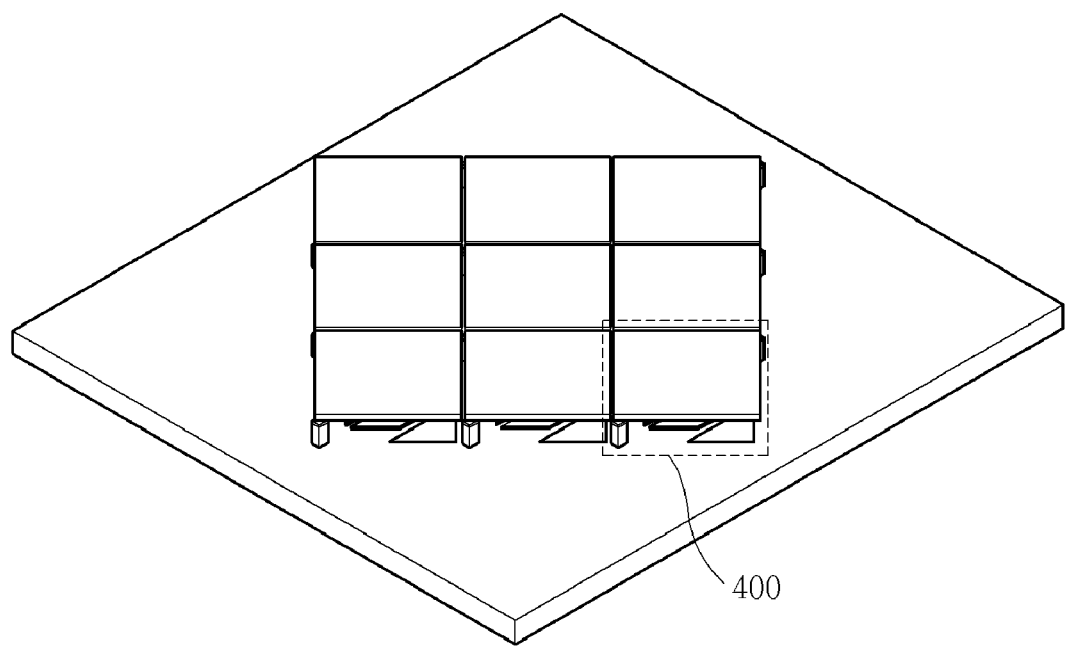
FIG. 13 is a perspective view illustrating a micro mirror array using a micro mirror in accordance with a third embodiment of the present invention.

FIG. 13 is a perspective view illustrating a micro mirror array using a micro mirror 400 in accordance with a third embodiment of the present invention.

As shown in FIG. 13, the micro mirror array includes a plurality of micro mirrors 400 in accordance with a third embodiment of the present invention, which are arranged in row and column directions. In the micro mirror array shown in FIG. 13, since the reflecting body is formed to upper portions of the hinges and the support units, loss of incident light in the hinges and the support units may be reduced.

Figure 14:
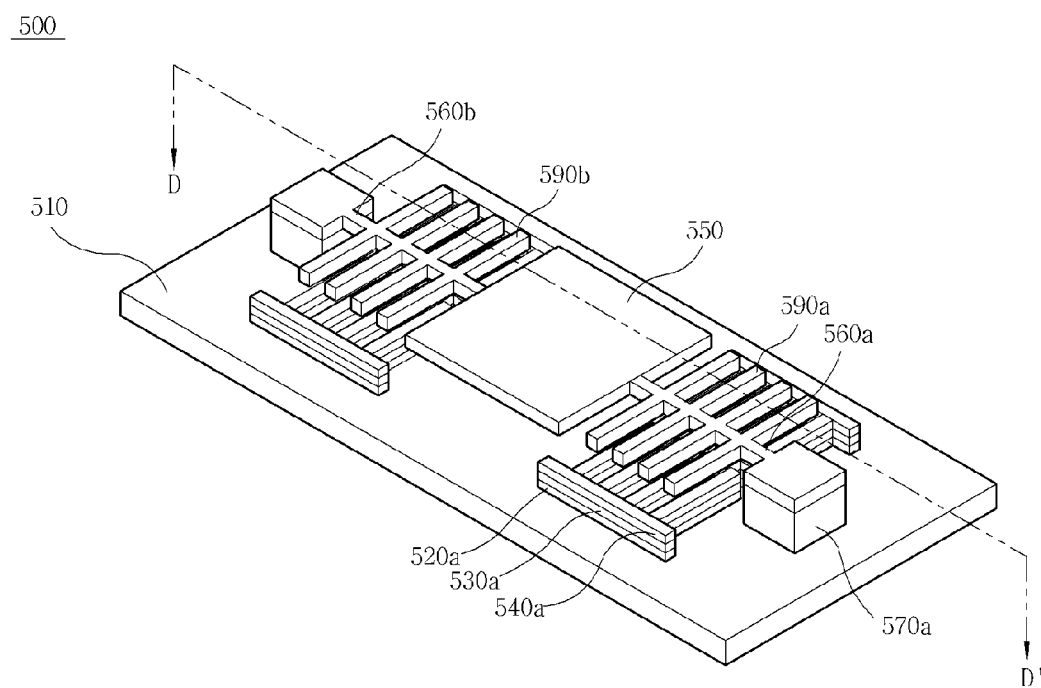
FIGS. 14 and 15 are views illustrating a micro mirror in accordance with a fourth embodiment of the present invention.
Figure 15:
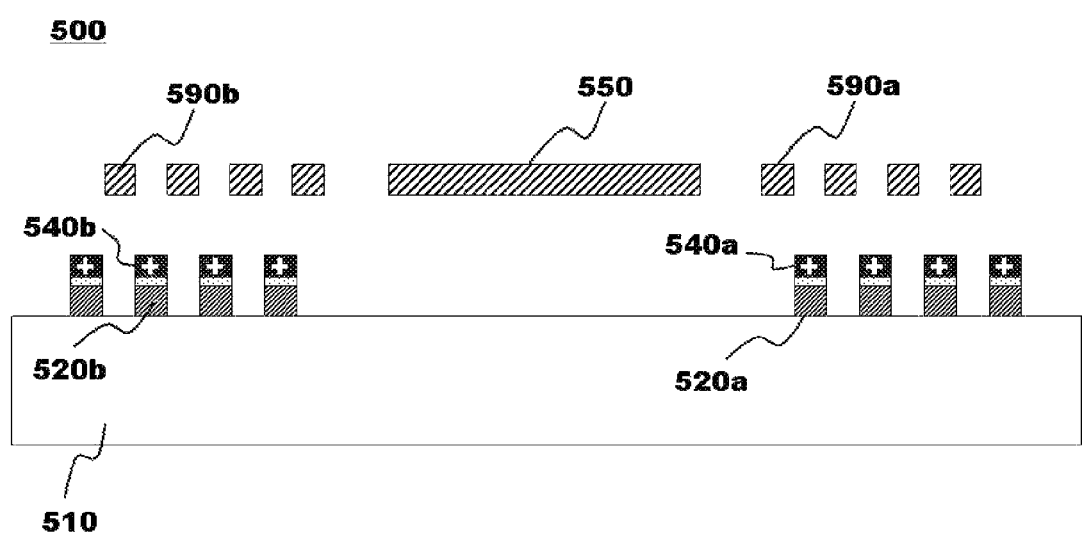

FIGS. 14 and 15 are views illustrating a micro mirror 500 in accordance with a fourth embodiment of the present invention. FIG. 14 is a perspective view of the micro mirror 500, and FIG. 15 is a cross-sectional view taken along line D-D' of FIG. 14.

Unlike the micro mirror 400 in accordance with a third embodiment of the present invention shown in FIGS. 11 and 12, as shown in FIGS. 14 and 15, in the micro mirror 500 in accordance with a fourth embodiment of the present invention, first and second transfer electrodes 590a and 590b are formed on the same plane as that of the reflecting body 550, and electrically or non-electrically connected to the reflecting body 550. The first and second transfer electrodes 590a and 590b are connected to first and second hinges 560a and 560b, respectively. Since the first and second transfer electrodes 590a and 590b have a comb pattern widening a cross section area to the greatest degree, the micro mirror 500 may be driven with a voltage less than that of the micro mirror 400 in accordance with the third embodiment of the present invention.

The first and second hinges 560a and 560b are made with an elastic material. The first and second hinges 560a and 560b are formed in a rotational shaft of the reflecting body 550, and the first and second transfer electrodes 590a and 590b. The first and second hinges 560a and 560b enable the reflecting body 550, and the first and second transfer electrodes 590a and 590b to rotate. The first and second hinges 560a and 560b are attached to the first and second support units 570a and 570b, respectively. The first and second support units 570a and 570b support the first and second transfer electrodes 590a and 590b on the insulation substrate 510.

Meanwhile, because a driving method of the micro mirror 500 in accordance with the fourth embodiment of the present invention is identical with that of the micro mirror 400 in accordance with the third embodiment of the present invention, a description thereof is omitted. A micro mirror array is constructed by arranging a plurality of micro mirrors 500 in accordance with the fourth embodiment of the present invention in a row or column direction.

Figure 16:
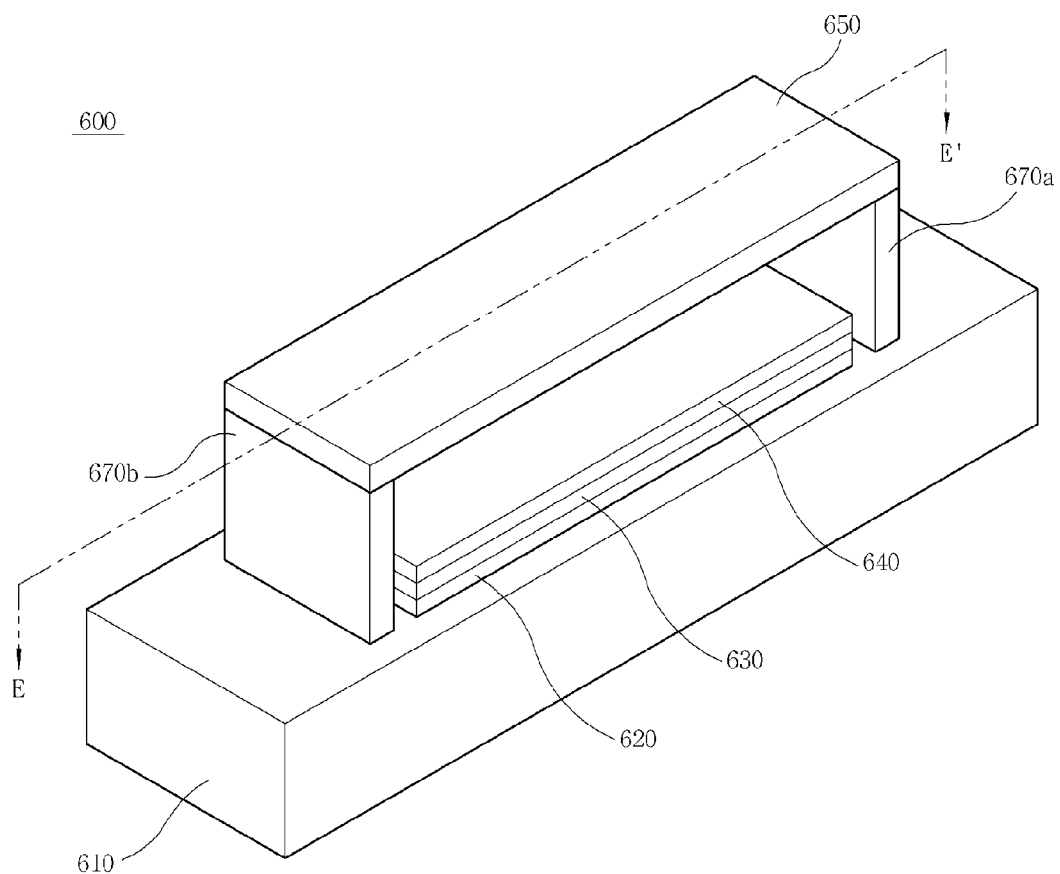
FIGS. 16 and 17 are views illustrating a micro mirror in accordance with a fifth embodiment of the present invention.
Figure 17:
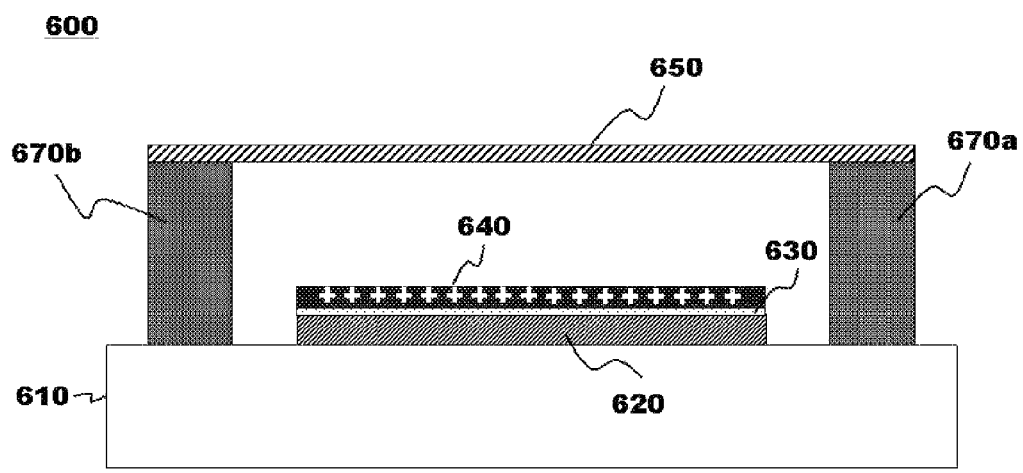

FIGS. 16 and 17 are views illustrating a micro mirror 600 in accordance with a fifth embodiment of the present invention. FIG. 16 is a perspective view of the micro mirror 600, and FIG. 17 is a cross-sectional view taken along line E-E' of FIG. 16.

As shown in FIGS. 16 and 17, the micro mirror 600 in accordance with a fifth embodiment of the present invention includes an insulation substrate 610, an address electrode 620, a charging unit 640, a reflecting body 650, and first and second support units 670a and 670b. The charging unit 640 is electrically insulated from the address electrode 620. The first and second support units 670a and 670b support the reflecting body 650 from the insulation substrate 610. In this case, since the insulation substrate 610, the address electrode 620, the charging unit 640, and the first and second support units 670a and 670b has the same constructions and functions as those of the insulation substrate 210, the address electrode 220a and 220b, the first and second charging units 240a and 240b, and the first and second support units 270a and 270b, the description thereof is omitted.

The reflecting body 650 is made with an elastic material to have a restoring force itself. According to a driving voltage applied between the address electrode 620 and the reflecting body 650, and between the charging unit 640 and the reflecting body 650, the reflecting body 650 may move in a direction of the address electrode 620. Hereinafter a method for driving the micro mirror 600 in accordance with a fifth embodiment of the present invention will be described in detail.

After the charging unit 640 is charged with a charge, it becomes in an electrically floating state. Accordingly, the charge induced in the charging unit 640 is maintained. Next, a driving voltage is applied between the address electrode 620 and the reflecting body 650 to induce different polar charges in the address electrode 620 and the reflecting body 650, respectively. A voltage is applied to the address electrode 620 so that a charge having the same polarity as that of the charge induced in the charging unit 640 may be induced in the charging unit 640. Accordingly, a first electrostatic attraction is generated between the reflecting body 650 and the charging unit 640, and a second electrostatic attraction is generated between the reflecting body 650 and the address electrode 620. If a sum of the first and second electrostatic attractions is equal to or greater than a threshold value, a center part of the reflecting body 650 is bent in a direction of the address electrode 620 to reflect incident light at a predetermined angle.

Meanwhile, arrangement of a plurality of micro mirrors 600 in accordance with the fifth embodiment of the present invention shown in FIGS. 16 and 17 in a row or column direction constructs a micro mirror array.

Although embodiments in accordance with the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A micro mirror, comprising:
    an insulation substrate;
    an address electrode formed on the insulation substrate;
    a charging unit electrically insulated from the address electrode;
    a reflecting body rotatably provided on the insulation substrate to reflect incident light and spaced apart from the address electrode and the charging unit;
    a transfer electrode connected to a surface of the reflecting body opposite a reflecting surface of the reflecting body that reflects the incident light;
    a hinge connected to a rotational shaft of the transfer electrode; and
    a support unit supporting the transfer electrode from the insulation substrate.

2. The micro mirror according to claim 1, further comprising an insulation layer formed between the address electrode and the charging unit.

3. The micro mirror according to claim 1, wherein the charging unit is spaced apart from the address electrode on the insulation substrate.

4. The micro mirror according to claim 1, wherein the hinge is made with an elastic material.

5. The micro mirror according to claim 1, wherein the reflecting body is formed on the hinge and the support unit to prevent exposure of the hinge and the support unit to the incident light.

6. The micro mirror according to claim 1, further comprising a support unit supporting the reflecting body from the insulation substrate, wherein the reflecting body is made with an elastic material.

7. The micro mirror according to claim 1, wherein the charging unit is previously charged with a charge.

8. The micro mirror according to claim 1, further comprising a discharge prevention layer formed on a surface of the charging unit.

9. A micro mirror comprising:
    an insulation substrate;
    an address electrode formed on the insulation substrate;
    a charging unit electrically insulated from the address electrode;
    a reflecting body rotatably provided on the insulation substrate to reflect incident light and spaced apart from the address electrode and the charging unit;
    a transfer electrode formed on the same plane as that of the reflecting body and connected to the reflecting body;
    a hinge connected to a rotational shaft of the transfer electrode; and
    a support unit supporting the transfer electrode from the insulation substrate.

10. The micro mirror according to claim 9, wherein the transfer electrode has a comb pattern.

11. The micro mirror according to claim 9, wherein the hinge is made with an elastic material.

12. The micro mirror according to claim 9, further comprising a support unit supporting the reflecting body from the insulation substrate, wherein the reflecting body is made with an elastic material.

13. The micro mirror according to claim 9, wherein the charging unit is previously charged with a charge.

14. The micro mirror according to claim 9, further comprising a discharge prevention layer formed on a surface of the charging unit.

15. A micro mirror array including a plurality of micro mirrors arranged in a row or column direction, each of the micro mirrors comprising:
    an insulation substrate;
    an address electrode formed on the insulation substrate;
    a charging unit electrically insulated from the address electrode;
    a reflecting body rotatably provided on the insulation substrate to reflect incident light and spaced apart from the address electrode and the charging unit;
    a transfer electrode connected to a surface of the reflecting body opposite a reflecting surface of the reflecting body that reflects the incident light
    a hinge connected to a rotational shaft of the transfer electrode; and
    a support unit supporting the transfer electrode from the insulation substrate.

16. The micro mirror array according to claim 15, wherein the micro mirror further comprises an insulation layer formed between the address electrode and the charging unit.

17. The micro mirror array according to claim 15, wherein the charging unit of the micro mirror is spaced apart from the address electrode on the insulation substrate.

18. The micro mirror array according to claim 15, wherein the hinge is made with an elastic material.

19. The micro mirror array according to claim 15, wherein the reflecting body is formed on the hinge and the support unit to prevent exposure of the hinge and the support unit to the incident light.

20. The micro mirror array according to claim 15, where the micro minor further comprises a support unit supporting the reflecting body on the insulation substrate, the reflecting body having a restoring force.

21. The micro mirror array according to claim 15, wherein the charging unit of the micro mirror is previously charged with a charge.

22. The micro mirror array according to claim 15, further comprising a discharge prevention layer formed on a surface of the charging unit of the micro mirror.

23. A micro mirror array including a plurality of micro mirrors arranged in a row or column direction, each of the micro mirrors comprising:
    an insulation substrate;
    an address electrode formed on the insulation substrate;
    a charging unit electrically insulated from the address electrode;
    a reflecting body rotatably provided on the insulation substrate to reflect incident light and spaced apart from the address electrode and the charging unit;
    a transfer electrode formed on the same plane as that of the reflecting body and connected to the reflecting body;
    a hinge connected to a rotational shaft of the transfer electrode; and
    a support unit supporting the transfer electrode from the insulation substrate.

24. The micro mirror array according to claim 23 wherein the transfer electrode has a comb pattern.

25. The micro mirror array according to claim 23, wherein the hinge is made with an elastic material.

26. The micro mirror array according to claim 23, where the micro mirror further comprises a support unit supporting the reflecting body on the insulation substrate, the reflecting body having a restoring force.

* * * * *